(12) United States Patent
Joseph

(10) Patent No.: US 10,682,008 B2
(45) Date of Patent: Jun. 16, 2020

(54) APPARATUS AND METHOD FOR DISPENSING A BEVERAGE

(71) Applicant: Steven William Joseph, Portland, OR (US)

(72) Inventor: Steven William Joseph, Portland, OR (US)

(*) Notice: Subject to any disclaimer, the term of this patent is extended or adjusted under 35 U.S.C. 154(b) by 304 days.

(21) Appl. No.: 15/902,691

(22) Filed: Feb. 22, 2018

(65) Prior Publication Data

US 2019/0254467 A1    Aug. 22, 2019

(51) Int. Cl.
*A47J 31/46* (2006.01)
*A47J 31/44* (2006.01)
*A47J 31/40* (2006.01)

(52) U.S. Cl.
CPC ............ *A47J 31/46* (2013.01); *A47J 31/407* (2013.01); *A47J 31/4407* (2013.01); *A47J 31/4492* (2013.01)

(58) Field of Classification Search
CPC .... A47J 31/46; A47J 31/4492; A47J 31/4407; A47J 31/407; A47J 31/3676; B65D 85/8043
See application file for complete search history.

(56) References Cited

U.S. PATENT DOCUMENTS

2014/0106055 A1    4/2014  Gamay
2019/0328170 A1*  10/2019  Cai .................. A47J 31/30

\* cited by examiner

*Primary Examiner* — John C Hong
(74) *Attorney, Agent, or Firm* — Ellenoff Grossman & Schole LLP; James M. Smedley; Alex Korona

(57) ABSTRACT

An assembly is disclosed. The assembly has a body member, an intermediate member attached to the body member, and a first sealed cavity formed by the body member and the intermediate member. The assembly also has a cover member attached to the body member, and a second sealed cavity formed by the cover member, the body member, and the intermediate member. The assembly further has a beverage-preparation liquid concentrate disposed in the second sealed cavity.

20 Claims, 10 Drawing Sheets

APPARATUS AND METHOD FOR DISPENSING A BEVERAGE

TECHNICAL FIELD

The present disclosure generally relates to an apparatus and method for dispensing a beverage, and more particularly to an apparatus and method for single serve dispensing of a beverage.

BACKGROUND

Single serve beverage cups or pods for use in single serve beverage brewers and dispensers, such as K-Cup® pods manufactured by Keurig®, have been widely accepted for their convenience. Conventional single serve pods are comprised of a plastic container having a filter element and a region below the filter element whereby filtered liquid can be extracted. A solid beverage media, such as coffee grounds or tea solid media, is placed within the filter region with a foil lid sealing the contents. To extract and brew the contents, the single serve pod is typically placed into a holder portion of a brewing machine, the holder portion typically having an upper penetrating liquid delivery needle and a lower extraction needle. Typically a handle is used to close a cover of the holder portion over the single serve pod, which causes both an upper penetrating liquid delivery needle and a lower extraction needle to penetrate the single serve pod. Heated liquid is then typically pumped by the brewing machine through the delivery needle, where it interacts with the contents of the single serve pod to form an extracted beverage. The extracted beverage is then urged through the filter element of the single serve pod to a lower compartment of the single serve pod as a brewed beverage. The brewed beverage media is dispensed through the lower extraction needle into a receptacle placed below the holder portion of the brewing machine.

Several disadvantages are associated with conventional single serve pods regarding freshness, cost to produce, consistency in flavor, and waste. For example in the case of coffee grounds, prior to packing, the grounds must be stored to reduce the effects of off-gassing once sealed, which effectively prevents coffee grounds from being packaged freshly in single serve pods. Also, conventional single serve pods utilize an additional element (e.g., a filter element) to prevent solid beverage media such as coffee grounds from passing through the lower extraction needle. This added component (e.g., the filter element) increases the pod's cost and creates an additional item of waste. Also, an additional separate compartment is provided in the single serve pod below the filter element, to keep the lower extraction needle from penetrating the filter element. Providing the separate compartment adds additional material, cost, and waste to be disposed of to the conventional single serve pod. Further, retail packaging is relatively large to accommodate the additional components and depth of conventional single serve pods as described above, which involves additional retail shelf space and shipping cost based on the relatively large retail packaging.

Further for example, liquid having a specific temperature range is maintained by the brewing machine in order for the conventional extraction process to work properly, which causes the beverages to be dispensed hot for the process to operate suitably. Variations in the specific temperature range may negatively affect flavor. Also, proper extraction involves homogeneously mixing a liquid with a beverage media. Variations in saturation rates and exposure times of the mixing, though, may negatively affect consistency of flavor of the dispensed beverage. Additionally, construction and contents of conventional single serve pods are difficult to recycle without taking additional steps to prepare for recycling, such as removal of the lid of the pod, removal and disposal of used beverage media that can be messy for a user to attempt, and removal and disposal of the filter element.

Conventional techniques for providing single serve pods are unsuitable for shelf-stable liquid concentrates to be used. For example, to work in conventional single serve brewers, a pod having liquid concentrate is appropriately sized to reach the lower extraction needle of conventional brewing machines, thereby involving additional material and/or concentrate, which increases cost. Such additional material takes up valuable warehouse and retail shelf space, adds to shipping costs, and creates additional waste. Also, in conventional brewing machines, penetration of the pod by the lower extraction needle immediately dispenses liquid concentrate contained within the pod due to gravity prior to the brew process being initiated. Accordingly, if a user inserts a conventionally-designed liquid concentrate single serve pod into a conventional brewing machine and closes the brewing machine before a receptacle such as a cup is placed under the dispensing portion, unbrewed liquid concentrate will leak out and create a mess and also render the single serve pod ineffective. For example, a leak may occur once the single serve pod is punctured by the brewing machine, and before operation of the brewing process begins.

U.S. Patent Publication Number US2014/0106055A1 ("the '055 publication") attempts to address some of the above shortcomings. The '055 publication discloses use of a stabilizing gum intended to increase viscosity and prevent leaking when placed into a brewing machine. However, this approach creates an additional component to be used in each single serve pod, which creates additional costs. Further, the stabilizing gum may negatively affect a texture of a brewed beverage (e.g., as perceived by some consumers). Also, the added viscosity and pressure involved in dispensing a beverage using the pod having stabilizing gum may impair or ultimately reduce the service life of a brewing machine. Further, brewing machine needles may form a gummy residue involving frequent cleaning or maintenance over time. Also, for the process of the '055 publication to work correctly, a viscosity is matched to the orifice size of the extraction needle, which may lead to the single serve pods using the method of the '055 publication being incompatible with brewing machines made by some manufacturers. Also for example, the single serve pods of the '055 publication may be of a similar size as conventional pods, and accordingly may not reduce an amount of waste associated with conventional pods.

The exemplary disclosed method and apparatus is directed to overcoming one or more of the shortcomings set forth above and/or other deficiencies in existing technology.

SUMMARY OF THE DISCLOSURE

In one exemplary aspect, the present disclosure is directed to an assembly. The assembly includes a body member, an intermediate member attached to the body member, and a first sealed cavity formed by the body member and the intermediate member. The assembly also includes a cover member attached to the body member, and a second sealed cavity formed by the cover member, the body member, and the intermediate member. The assembly further includes a beverage-preparation liquid concentrate disposed in the second sealed cavity.

In another aspect, the present disclosure is directed to an assembly. The assembly includes a body member, an intermediate member attached to the body member, and a first cover member attached to the body member. The assembly also includes a first sealed cavity formed by the first cover member and the intermediate member, and a second cover member attached to the body member. The assembly further includes a second sealed cavity formed by the second cover member, the body member, and the first cover member. The assembly also includes a beverage-preparation liquid concentrate disposed in the second sealed cavity.

DETAILED DESCRIPTION AND INDUSTRIAL APPLICABILITY

Figure 1:
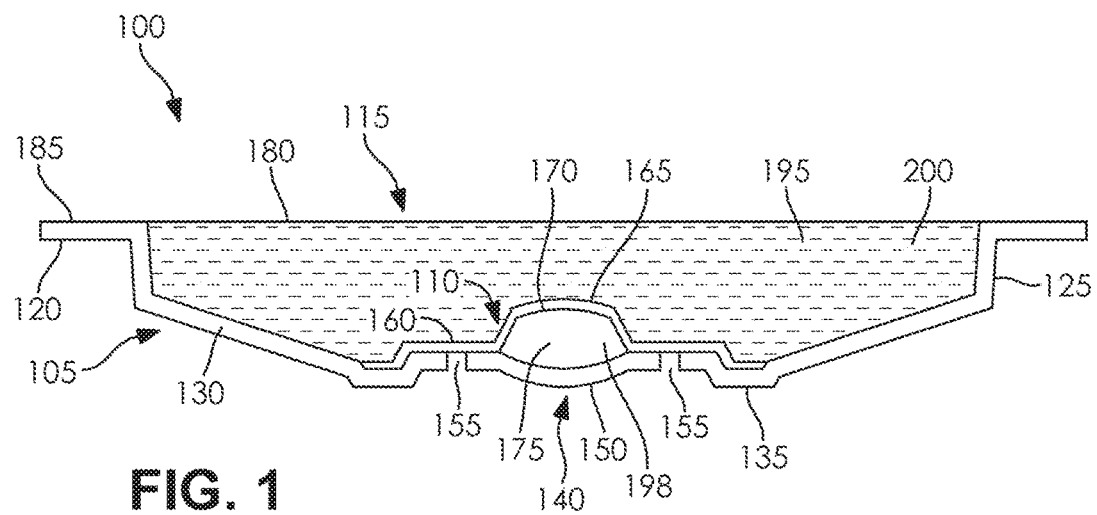
FIG. 1 is a schematic view of an exemplary embodiment of the present invention.

FIG. 1 illustrates an exemplary assembly 100. Assembly 100 may be any suitable assembly for storing, containing, and/or dispensing material for use in preparation of a beverage. For example, assembly 100 may be any suitable assembly for storing, containing, and/or dispensing material for use in preparing coffee, tea, juices (e.g., orange juice, apple juice, and/or any other type of juice), energy and/or nutritional drinks, milk, shake and/or other dessert beverages, baby formula, medicine (e.g., medicine to be mixed with a liquid), and/or any other suitable type of beverage formed by mixing material with one or more liquids. For example, assembly 100 may contain a material for preparing beverages such as, e.g., a liquid material and/or a solid material. For example, assembly 100 may be any suitable assembly for storing, containing, and/or dispensing liquid concentrate material for use in preparing a beverage. For example, assembly 100 may be any suitable assembly for storing, containing, and/or dispensing liquid concentrate material for use in preparing coffee or tea (e.g., or any other beverage as disclosed, for example, herein). Also for example, assembly 100 may be any suitable assembly (e.g., a pod or cup) for use in a single serve beverage-preparation device such as, e.g., a single serve brewing machine for brewing coffee and/or tea, a machine for preparing dessert beverages such as shakes or fruit and vegetable drinks, and/or any other machine or device for preparing beverages by using pods or cups. For example, assembly 100 may be a single serve pod or cup for use in a single serve beverage-preparation device.

Assembly 100 may include a body member 105, an intermediate member 110, and a cover member 115. Intermediate member 110 may be attached to body member 105 to form a first cavity as disclosed for example below. Cover member 115 may be attached to body member 105 to form a second cavity as disclosed for example below. For example, assembly 100 may be a reduced-depth cup or pod having two cavities (e.g., sealed cavities or compartments) as disclosed in at least some of the exemplary embodiments below. For example, body member 105 may be a single serve pod body member, intermediate member 110 may be a single serve pod intermediate member, and cover member 115 may be a single serve pod cover member.

Assembly 100 may be formed from any suitable material for holding a media for preparing a beverage. For example, assembly 100 may be formed from plastic and/or aluminum materials. For example, body member 105 and/or intermediate member 110 may be formed from similar or different plastic materials. For example, body member 105 and/or intermediate member 110 may be formed from polymer material, co-polymer material, thermoplastic and thermosetting polymers, resin-containing material, polyethylene, polystyrene, polypropylene, epoxy resins, phenolic resins, Acrylanitrile Butadiene Styrene (ABS), Polycarbonate (PC), Mix of ABS and PC, Acetal (POM), Acetate, Acrylic (PMMA), Liquid Crystal Polymer (LCP), Mylar, Polyamid-Nylon, Polyamid-Nylon 6, Polyamid-Nylon 11, Polybutylene Terephthalate (PBT), Polycarbonate (PC), Polyetherimide (PEI), Polyethylene (PE), Low Density PE (LDPE), High Density PE (HDPE), Ultra High Molecular Weight PE (UHMW PE), Polyethylene Terephthalate (PET), PolPolypropylene (PP), Polyphthalamide (PPA), Polyphenylenesulfide (PPS), Polystyrene (PS), High Impact Polystyrene (HIPS), Polysulfone (PSU), Polyurethane (PU), Polyvinyl Chloride (PVC), Chlorinated Polyvinyl chloride (CPVC), Polyvinylidenefluoride (PVDF), Styrene Acrylonitrile (SAN), Teflon TFE, Thermoplastic Elastomer (TPE), Thermoplastic Polyurethane (TPU), and/or Engineered Thermoplastic Polyurethane (ETPU), or any suitable combination thereof. Also for example, body member 105 and/or intermediate member 110 may be formed from any suitable recyclable, biodegradable, and/or compostable material. For example, body member 105 and/or intermediate member 110 may be formed from plant-derived material such as biomass and polyester material. For example, body member 105 and/or intermediate member 110 may be formed from bio-based polyesters such as, e.g., polylactide acid (PLA) and/or polyhydroxyalkanoate (PHA). Also for example, body member 105 and/or intermediate member 110 may be formed from Polyhydroxybutyrate (PHB), PHA-blended starch/cellulose plastics, Cellulose Acetate, cellophane, starch-based plastics, Polybutylene succinate (PBS), Polycaprolactone (PCL), Polybutyrate adipate terephthalate (PBAT), Polyvinyl alcohol (PVOH/PVA), and/or any other suitable similar recyclable, biodegradable, and/or compostable material. For example, body member 105 and/or intermediate member 110 may be formed from any suitable material meeting ASTM D6400 and/or ASTM D6868 specifications.

In addition to including one or more above exemplary materials (e.g., or any suitable combination of materials) similar to body member 105 and intermediate member 110, cover member 115 may include foil material such as, e.g., a thin layer of metal material (e.g., or a thin layer of plastic or other suitable material). For example, cover member 115 may include any suitable malleable material such as, e.g., aluminum foil, tin foil, and/or any other suitable metal foil material. Also for example, cover member 115 may include any suitable recyclable, biodegradable, and/or compostable material for use as a cover of assembly 100.

Also for example, body member 105, intermediate member 110, and/or cover member 115 may be formed from any suitable opaque materials that may be designed to block out ambient light that may shorten a shelf life of materials for beverage preparation that may be contained within assembly 100. Also, it is contemplated that body member 105, intermediate member 110, and/or cover member 115 may be formed from one or any suitable combination of any of the exemplary materials disclosed above.

Figure 2:
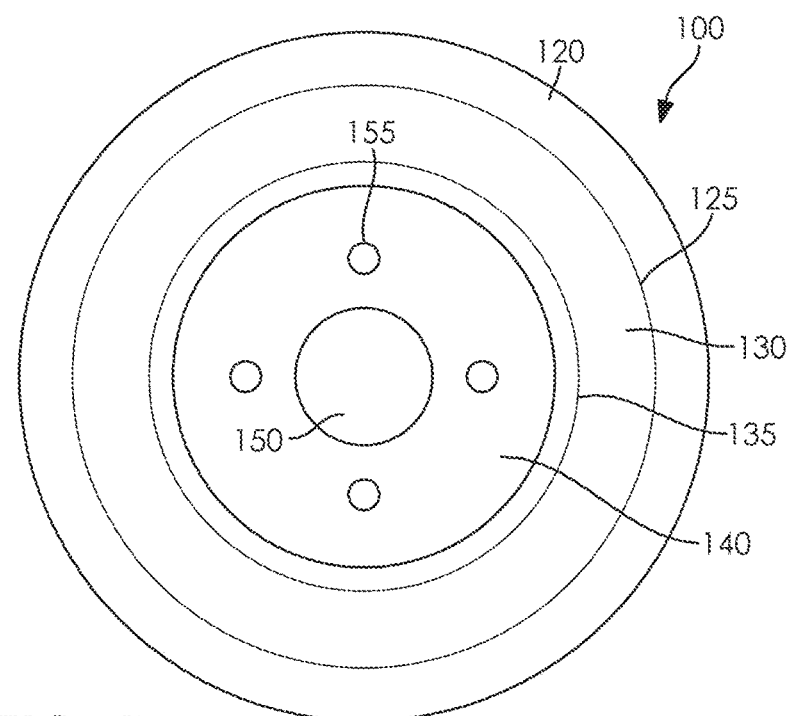
FIG. 2 is a bottom view of an exemplary embodiment of the present invention.
Figure 3:
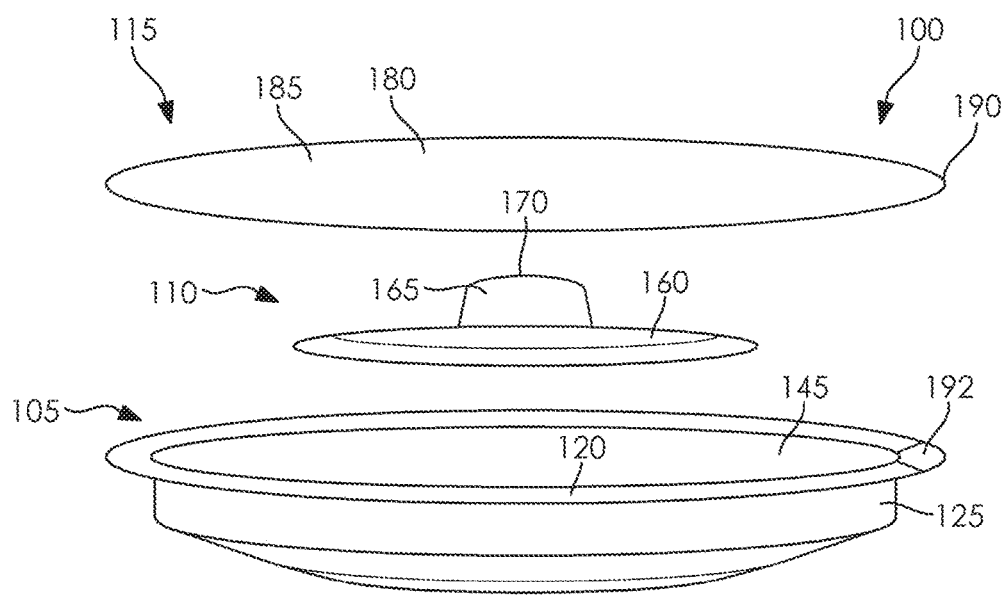
FIG. 3 is an exploded view of an exemplary embodiment of the present invention.

As illustrated in FIGS. 1, 2, and 3, body member 105 may for example include a substantially flat portion 120 extending about a perimeter of body member 105. For example, portion 120 may be a substantially flat annular portion extending around body member 105. Portion 120 may for example help to seat assembly 100 in a holding portion of a beverage-preparation machine as disclosed below. Portion 120 may be attached to or integrally formed with a portion 125. Portion 125 may be for example a side wall portion forming a side wall of body member 105. Portion 125 may be attached to or integrally formed with a portion 130. Portion 130 may form a floor portion of body member 105. For example, portion 130 may be sloped downward from portion 125 to a portion 135. Portion 130 may be attached to or integrally formed with portion 135. Portion 135 may be for example a protrusion extending about a perimeter of a portion 140. For example, portion 135 may be attached to or integrally formed with portion 140. Portion 140 may provide a central portion or central floor portion of body member 105. Portions 120, 125, 130, 135, and 140 may form an exterior of body member 105 having a plurality of surfaces (e.g., corresponding to respective exterior surfaces of portions 120, 125, 130, 135, and 140). Interior surfaces of portions 120, 125, 130, 135, and 140 may form an interior surface of body member 105 that may form a cavity 145 within body member 105.

Portion 140 may include a portion 150 that may form a central lower portion of both body member 105 and assembly 100. Portion 150 may be, for example, a protruding portion that extends from portion 140. Portion 140 may also include one or more apertures 155. Sloped portion 130 may for example direct material disposed within cavity 145 (e.g., material for preparing a beverage as disclosed for example below) toward apertures 155 (e.g., by gravity). For example as disclosed below, material (e.g., liquid such as a brewed beverage) may drain out of cavity 145 via apertures 155 (e.g., when intermediate member 110 has been removed as disclosed below).

Intermediate member 110 may include a portion 160 and a portion 165. Portions 160 and 165 may be attached to each other or integrally formed with each other. Portion 160 may be a substantially elongated (e.g., substantially flat elongated) portion. Portion 165 may be a protruding portion that extends from portion 160. For example, portion 165 may be a protruding portion of intermediate member 110 that extends from (e.g., protrudes from) portion 160 to form a protruding central portion of intermediate member 110. Portion 165 may have a portion 170 disposed at a center of portion 165 that may be a scored portion configured to be pierced (e.g., or punctured or ruptured) as disclosed for example below. Scored portion 170 of portion 165 may be for example disposed at a top portion of portion 165. Portion 170 may be for example a notched portion (e.g., and/or a portion having a relatively smaller cross section) that may be more easily pierced (e.g., or punctured or ruptured) relative to other portions of portion 165.

As illustrated in FIG. 1, intermediate member 110 may be disposed within cavity 145 of body member 105. For example, portion 160 of intermediate member 110 may be attached to portion 140, portion 135, and/or portion 130 of body member 105. For example, intermediate member 110 may be attached to body member 105 by any suitable technique such as, e.g., plastic heat welding methods, thermo-sealing, heat sealing, and/or ultrasonic sealing or welding. For example, intermediate member 110 may be attached to body member 105 by any suitable technique for forming a sealed connection between intermediate member 110 and body member 105. For example, portion 160 of intermediate member 110 may cover one or more apertures 155 of body member 105 so that apertures 155 are sealed. Accordingly for example, intermediate member 110 may be attached to body member 105 to form a cavity 175. For example, cavity 175 may be a sealed cavity (e.g., substantially sealed air-tight cavity) formed by (e.g., formed between) intermediate member 110 and body member 105. For example, cavity 175 may be an isolation chamber formed between intermediate member 110 and body member 105 that may keep contents (e.g., material for preparing beverages) from exiting assembly 100 as disclosed for example below.

As illustrated in FIGS. 1 and 3, cover member 115 may include a portion 180 that may be a relatively thin, elongated portion that may be sized to cover cavity 145. For example, portion 180 may be sized to be attached to a surface of portion 120 of body member 105. For example, a peripheral portion 185 of portion 180 may be attached to portion 120 of body member 105 by any suitable technique (e.g., such as techniques similar to those disclosed above regarding attaching intermediate member 110 to body member 105). Cover member 115 may seal cavity 145 when cover member 115 is attached to body member 105. For example, cover member 115 and body member 105 may be attached to form a seal (e.g., a substantially air-tight seal) of a portion of cavity 145 as disclosed below. For example, a sealed cavity may be formed by cover member 115, body member 105, and intermediate member 110.

Cover member 115 may also include a portion 190. Portion 190 may for example be a pull tab configured to be pulled by a user to create a rupture or tear in cover member 115 when cover member 115 is attached to body member 105. For example, a user may pull on portion 190 to manually open cover member 115 (e.g., break a seal formed between cover member 115 and body member 105). For example, portion 190 may be a pull tab intended to access a material 195 (e.g., a shelf-stable liquid concentrate) without utilizing a beverage-preparation machine (e.g., a single serve brewing machine) as disclosed below. For example, portion 190 may be a tab that may be integrated into cover member 115, which may allow a user to manually remove portion 190 of cover member 115 in a simple manner (e.g., without forcibly puncturing cover member 115) so that material 195 may be easily poured out of assembly 100. For example, portion 190 may allow a user to dispense material 195 (e.g., a liquid concentrate) into a receptacle (e.g., cup or mug) containing hot or cold liquid (e.g., such as water) without use of a specialized beverage-preparation machine (e.g., a single serve brewing machine).

Portion 190 may be aligned with a portion 192 of portion 120 of body member 105. Portion 192 may for example be a spout portion for facilitating pouring of material 195 from assembly 100 if assembly 100 is used to make a beverage without a beverage-preparation machine. For example, portion 192 may be suitably shaped to allow a smooth flow of material 195 from assembly 100. Also for example, portion 192 may be configured to fit within recesses of beverage-preparation machines so as not to interfere with an operation of a beverage-preparation machine when portions 190 and 192 are not used to manually pour material 195.

Assembly 100 may be manufactured by first providing body member 105. Intermediate member 110 may be attached to body member 105 to form sealed cavity 175 as disclosed for example above (e.g., a material may be placed in cavity 175 prior to sealing, as disclosed for example below). Material 195 may be disposed in a portion of cavity 145 disposed above intermediate member 110 (e.g., the portion of cavity 145 disposed above cavity 175). Cover member 115 may then be attached to body member 105 to form a sealed cavity (e.g., sealing the portion of cavity 145 disposed above intermediate member 110). For example, cavity 175 may comprise a first sealed cavity of assembly 100, and a cavity 200 may comprise a second sealed cavity of assembly 100 (e.g., a sealed cavity that is a portion of cavity 145 disposed above intermediate member 110). For example, material 195 may be disposed within sealed cavity 200 of assembly 100. Also for example, UV light may be used for sterilization of assembly 100 during the manufacturing process. Further for example, inert gas may be purged from assembly 100 (e.g., from cavity 175 and/or cavity 200) to maintain freshness of material 195 (e.g., and/or other material for preparing a beverage as disclosed below) using any suitable technique. Also for example, cavities 175 and 200 may be heat-welded, thermo-sealed, heat-sealed, and/or ultrasonic-sealed cavities.

Material 195 may be any suitable material for preparing a beverage. For example, material 195 may be a concentrated liquid or solid material for use in preparing a beverage. For example, material 195 may be a material for preparing a beverage such as, e.g., coffee, tea, shakes or fruit and/or vegetable drinks, and/or any other type of beverage that may be prepared by mixing with a liquid such as water. For example, material 195 may be a liquid concentrate material. Also for example, material 195 may be a liquid concentrate material for preparing hot and/or cold coffee and/or tea (e.g., or any other suitable type of beverage as disclosed, e.g., herein). For example, material 195 may be a beverage-preparation liquid concentrate. For example, material 195 may be a coffee liquid concentrate or a tea liquid concentrate. For example, material 195 may be a shelf-stable liquid beverage concentrate (e.g., a concentrate able to be stored for long periods without, for example, refrigeration or freezing), such as coffee or tea concentrate in liquid form. For example, material 195 may be a concentrate that may be mixed with a liquid such as water (e.g., or any other suitable liquid such as, for example, milk, juice, a solution including a plurality of substances and/or chemicals, and/or any other suitable material in liquid or fluid form) to form a beverage. For example, material 195 may be mixed with a liquid or fluid to prepare a hot beverage, cold beverage, beverage at room temperature, and/or a beverage at any suitable temperature. For example, material 195 may be a liquid concentrate that may not involve filtration when being used to prepare a beverage. For example, material 195 may be a liquid concentrate that may not involve filtration (e.g., may not involve filtration similar to filtration utilized for solid beverage media) when preparing a beverage. Further for example, material 195 may be any suitable material that may not leave a residue in assembly 100 following brewing (e.g., following a brew cycle). Accordingly for example, material 195 may be any suitable material that is substantially entirely removed from assembly 100 during a beverage-preparation process (e.g., following a brewing cycle, thereby simplifying a recycling process of assembly 100 and minimizing negative impact to the environment by removing substantially all residue of a beverage-preparation media, e.g., material 195, from assembly 100).

For example, material 195 may be a highly concentrated extract, which involves a relatively small volume of material 195 to mix with a liquid such as water to produce a beverage of any suitable size. For example, material 195 may be mixed with a liquid at any suitable ratio such as, e.g., between about 5:1 and about 200:1, between about 10:1 and about 150:1, between about 20:1 and about 120:1, between about 40:1 and about 100:1, between about 50:1 and about 80:1; and/or between about 60:1 and about 80:1 (e.g., about 70:1). For example, about one teaspoon (e.g., or any other suitable amount such as a half or a quarter of a teaspoon, or a quarter, a half, or any other suitable fraction of a tablespoon) of material 195 may be mixed with a liquid to prepare a beverage. For example, material 195 may be a liquid concentrate material that may be mixed at a ratio that is between about 30% and about 95% less than a solid media material (e.g., between about 50% and about 95% less, between about 60% and about 95% less, and/or between about 80% and about 90% less, e.g., about 90% less than a ratio of mixing for a solid material). For example, material 195 may be a liquid concentrate involving a reduced single serve pod or cup size as compared to cups or pods containing dry media material (e.g., up to a 90% reduced cup or pod size, which may allow for a reduction in waste).

Assembly 100 may be sized to provide any desired size of beverage (e.g., to product any desired size of a single serve beverage). For example, cavities 145, 175, and/or 200 may be sized to provide suitable amounts of material 195 to provide a beverage of any desired size. For example, assembly 100 may be sized to provide a single serve beverage (e.g., a cup, a carafe, and/or a pitcher) of between about 1 ounce and about 100 ounces (e.g., or larger or smaller), between about 6 ounces and about 20 ounces, between about 8 ounces and about 16 ounces, between about 8 ounces and about 12 ounces, between about 6 ounces and about 8 ounces, between about 20 ounces and about 80 ounces, between about 30 ounces and about 64 ounces, and/or between about 48 ounces and about 64 ounces.

In at least some exemplary embodiments, a material 198 may be disposed in cavity 175. Material 198 may be a material that is similar to material 195, which may provide a material (e.g., an additional material) for mixing with a liquid to provide a beverage. For example, material 198 may be a beverage additive (e.g., a beverage flavoring, a medical supplement, and/or any other material that may be added to a beverage). For example when material 195 disposed in cavity 200 is a liquid concentrate for providing a coffee or tea beverage, material 198 may be a liquid or solid media material such as, e.g., cream and/or sugar. For example, material 198 may be a powder component such as, e.g., powered coffee creamer, powdered milk, and/or powdered sugar. For example, material 198 may be a solid or liquid media material and/or liquid concentrate material that may provide a material in addition to material 195 for mixing with a liquid such as water to provide a beverage. For example, after material 195 may be mixed with a liquid such as water during a brew cycle, material 198 may be mixed with the brewed beverage during a dispensing cycle as disclosed for example below. For example, material 198 may include additive components (e.g., flavoring components, medical supplements, and/or any other materials that may be added to a beverage) that may have a prolonged shelf life if stored in a separate compartment (e.g., if stored separately from material 195) such as cavity 175 that may be pierced or punctured just prior to brewing as disclosed, e.g., below.

Figure 4:
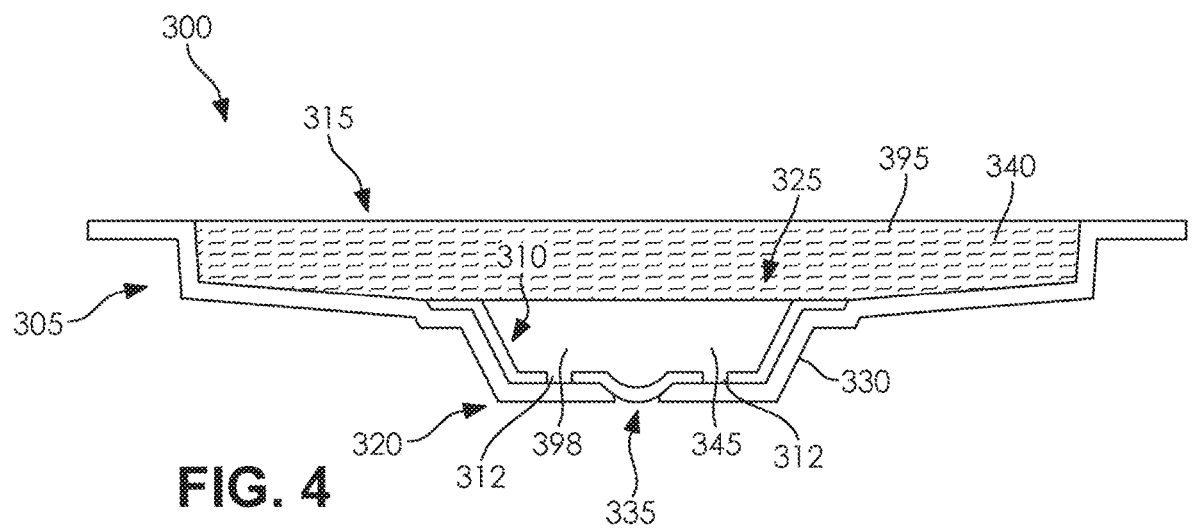
FIG. 4 is a schematic view of an exemplary embodiment of the present invention.

For example, FIG. 4 illustrates an assembly 300 as another exemplary embodiment of the exemplary disclosed apparatus and method. Assembly 300 may be formed from similar materials as assembly 100 and may include a body member 305 that may be generally similar to body member 105, an intermediate member 310 that may be generally similar to intermediate member 110, a cover member 315 that may be generally similar to cover member 115, a lower body member 320, and a lower cover member 325.

Body member 305 may have a portion 330 that may be similar to portion 130 of body member 105. Lower body member 320 may be attached to body member 305 by any suitable technique (e.g., similar to the attachment techniques disclosed above regarding assembly 100). For example, body member 305 and lower body member 320 may be attached members or integral portions making up a body member of assembly 300. Portion 330 may provide sloped side walls that may direct a brewed beverage to a bottom of assembly 300. Lower body member 320 may also include one or more apertures 335 disposed at a central portion of lower body member 320. For example, lower body member 320 may have a single aperture 335 disposed at a center of lower body member 320.

Intermediate member 310 may be attached to lower body member 320 similarly to an attachment of intermediate member 110 of assembly 100. Intermediate member 310 may cover or seal one or more apertures 335 similarly to a sealing of apertures 155 by intermediate member 110. Cover member 315 may seal body member 305 and lower cover member 325 may seal lower body member 320 similar to the sealing by cover member 115 disclosed for example above. Two sealed cavities 340 and 345 may thereby be provided as for example illustrated in FIG. 4. A material 395 that may be similar to material 195 may be disposed (e.g., sealed) in cavity 340 and a material 398 that may be similar to material 198 may be disposed (e.g., sealed) in cavity 345 by techniques similar to as disclosed above regarding assembly 100. For example, sealed cavity 345 may be formed by lower cover member 325 and intermediate member 310, and sealed cavity 340 may be formed by cover member 315, body member 305, and lower cover member 325. Intermediate member 310 may have one or more intermediate member apertures 312 that may for example be misaligned with one or more apertures 335. For example, apertures 312 and apertures 335 may be misaligned so that one or more apertures 312 of intermediate member 310 may be sealed by lower body member 320. Also for example, cover member 315 may have a portion (e.g., pull tab) that is similar to portion 190 and is configured to be pulled by a user to create a rupture or tear in cover member 315.

Figure 5:
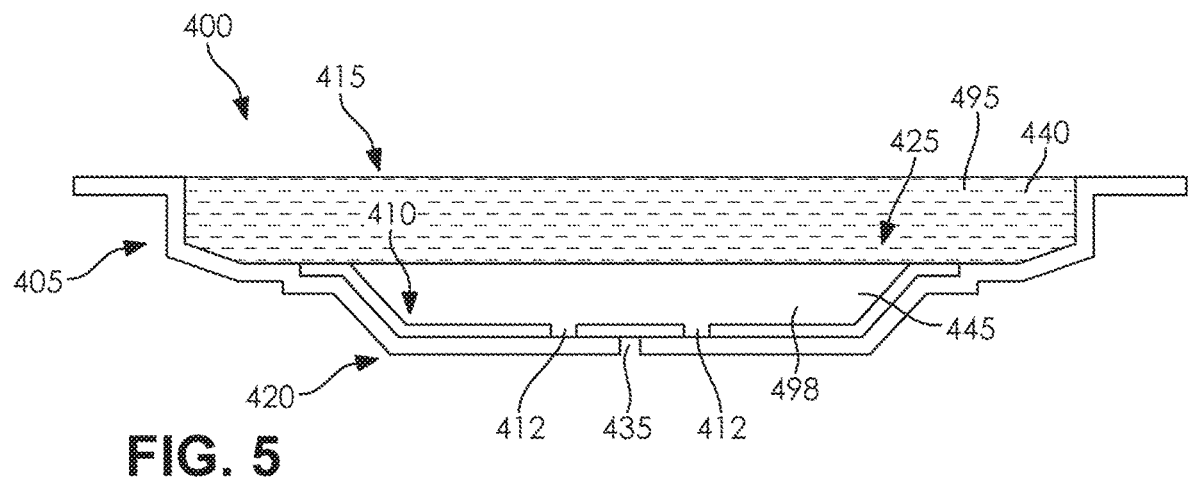
FIG. 5 is a schematic view of an exemplary embodiment of the present invention.

Further for example, FIG. 5 illustrates an assembly 400 as another exemplary embodiment of the exemplary disclosed apparatus and method. Assembly 400 may be generally similar to assembly 300 and may include a body member 405 that may be generally similar to body member 305, an intermediate member 410 that may be generally similar to intermediate member 310, a cover member 415 that may be generally similar to cover member 315, a lower body member 420 that may be generally similar to lower body member 320, and a lower cover member 425 that may be generally similar to lower cover member 325. For example, body member 405 and lower body member 420 may be attached members or integral portions making up a body member of assembly 400. Lower body member 420 and lower cover member 425 may be configured to extend along most or substantially an entire length (e.g., diameter) of body member 405. Lower body member 420 may have one or more apertures 435 that may be similar to one or more apertures 335. Two sealed cavities 440 and 445 may thereby be provided as for example illustrated in FIG. 5. A material 495 that may be similar to material 195 may be disposed (e.g., sealed) in cavity 440 and a material 498 that may be similar to material 198 may be disposed (e.g., sealed) in cavity 445 by techniques similar to those disclosed above regarding assembly 100. Assembly 400 may thereby provide two cavities 440 and 445 of similar capacity and/or a lower cavity 445 of increased capacity relative to cavity 440. Intermediate member 410 may have one or more intermediate member apertures 412 that may for example be misaligned with one or more apertures 435. For example, apertures 412 and apertures 435 may be misaligned so that one or more apertures 412 of intermediate member 410 may be sealed by lower body member 420. Also for example, cover member 415 may have a portion (e.g., pull tab) that is similar to portion 190 and is configured to be pulled by a user to create a rupture or tear in cover member 415.

Figure 6:
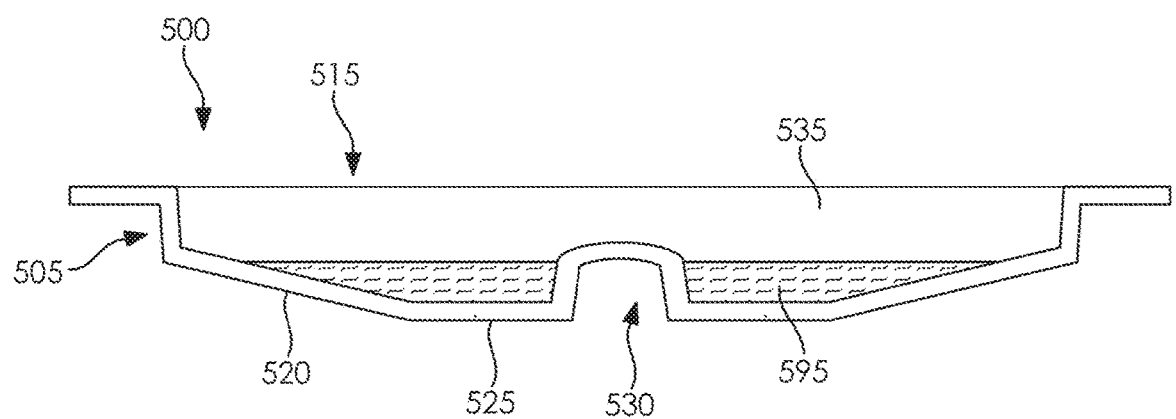
FIG. 6 is a schematic view of an exemplary embodiment of the present invention.

For example, FIG. 6 illustrates an assembly 500 as another exemplary embodiment of the exemplary disclosed apparatus and method. Assembly 500 may be formed from similar materials as assembly 100 and may include a body member 505 that may be generally similar to body member 105, and a cover member 515 that may be generally similar to cover member 115. Body member 505 may include a portion 520 that may slope downward to a portion 525, which may be attached or integrally formed with a portion 530. Portion 530 may have a wall thickness that is thinner relative to a wall thickness of portion 520. For example, portion 530 may have a wall thickness that is less than a wall thickness of a remaining portion of body member 505. Also for example, portion 530 may include a scored portion similar to scored portion 170. For example as disclosed below, the relatively thin walls of portion 530 may collapse (e.g., be displaced) under pressure (e.g., during a brew cycle). Portion 530 may be disposed at a central portion of body member 505 and may extend away from portion 525 to form a protruding portion (e.g., protrusion) extending into a cavity 535 (e.g., a sealed cavity formed by an attachment of cover member 515 to body member 505). A material 595 that may be similar to material 195 may be disposed in cavity 535. For example, as portion 530 extends into (e.g., upward into) cavity 535, portion 530 may serve as a barrier for blocking flow of material 595. For example, material 595 may be maintained by portion 530 at a level below an upper portion of portion 530 as illustrated in FIG. 6. For example, gravity may maintain material 595 below an upper portion of portion 530 when a brewing machine needle penetrates portion 530 (e.g., a scored portion of portion 530) as disclosed for example below. For example, assembly 500 may provide a single cavity (e.g., cavity 535) in which material 595 may be substantially blocked from exiting assembly 500. Also for example, cover member 515 may have a portion (e.g., pull tab) that is similar to portion 190 and is configured to be pulled by a user to create a rupture or tear in cover member 515.

For example, a total depth of the exemplary assembly (e.g., assembly 100, assembly 300, assembly 400, assembly 500, and/or any suitable exemplary disclosed assembly) may be less than a total width (e.g., a width measured across the exemplary assembly such as, for example, a diameter when the exemplary assembly has a substantially circular shape) of the exemplary disclosed assembly. For example, a total depth of the exemplary assembly may be less than or equal to, e.g., two-thirds, one-half, one-third, one-fourth, one-fifth, one-sixth, one-eighth, one-tenth, one-twelfth, and/or any other suitable fraction of a total width of the assembly. For example, a total depth of the exemplary assembly may be between about one-fourth and about one-fifth of a total width of the exemplary assembly. For example, a total depth of the exemplary assembly may be between about 0.375" and about 0.5" (e.g., or any other suitable dimension such as between about ⅛" and about 1", between about ¼" and about 1.5", and/or between about ½" and about 2" or larger for example for a carage or other relatively large-sized beverage serving). Also for example, a total width of the exemplary assembly may be between about 1" and about 3", and/or between about 1.5" and about 2.5" such as, for example, about 2" (e.g., or any other suitable size).

Figure 7:
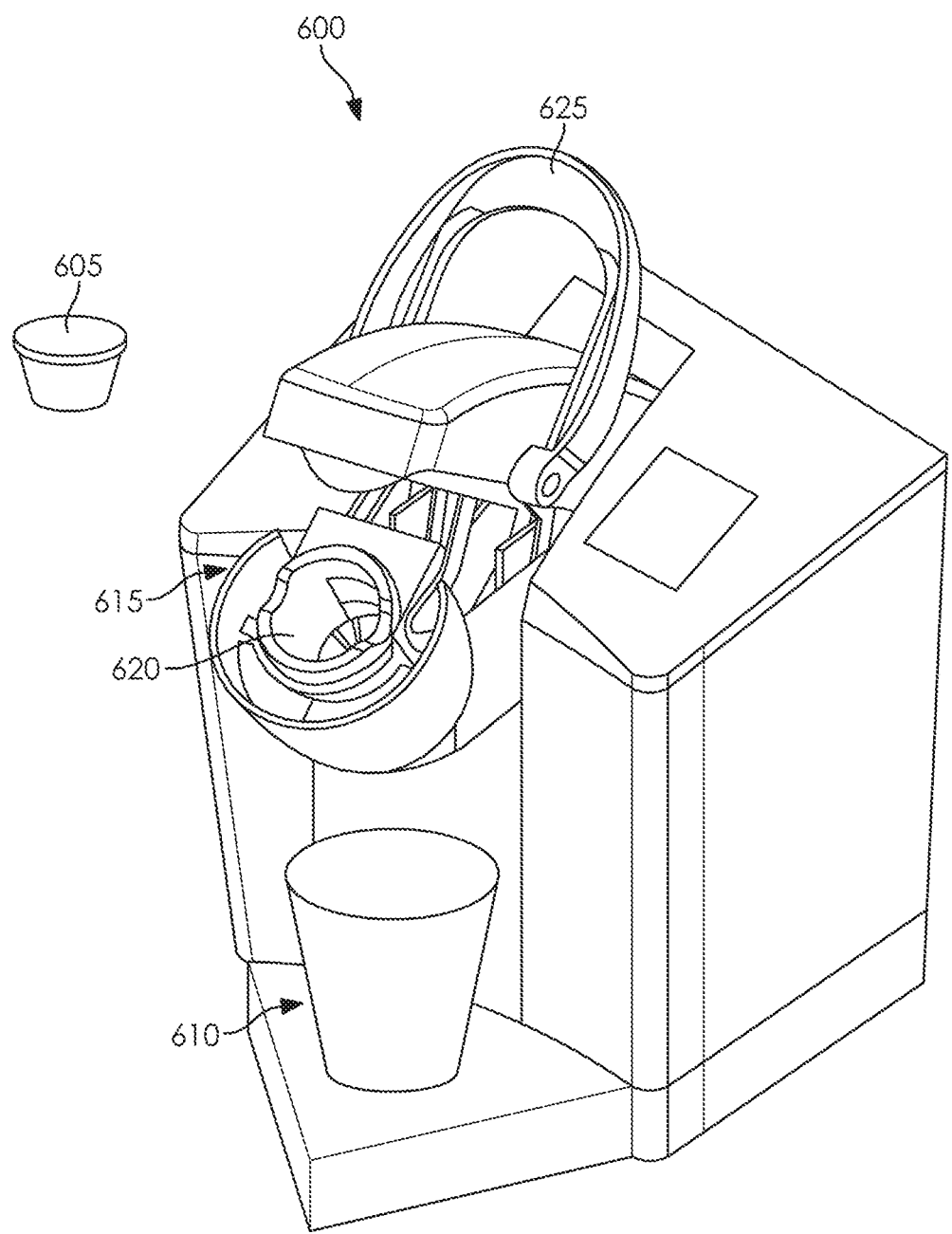
FIG. 7 is a perspective view of an exemplary system for using the present invention.

FIG. 7 illustrates an exemplary beverage-preparation machine 600 that may be used in conjunction with the exemplary disclosed apparatus and method. Machine 600 may be any suitable device for preparing a beverage such as, for example, a coffee and/or tea brewing machine and/or a machine for preparing any suitable type of beverage involving for example a single serve pod (e.g., orange juice, apple juice, energy and/or nutritional drinks, milk, shakes and/or other dessert beverages, baby formula, and/or medicine). For example, machine 600 may be a single serve pod brewing machine for brewing coffee and/or tea. For example, machine 600 may be configured to receive an assembly 605 (e.g., a single serve pod or cup) that may be, e.g., assembly 100, assembly 300, assembly 400, assembly 500, and/or any other assembly of the exemplary disclosed apparatus or method. Machine 600 may dispense a beverage, based on directing a liquid such as water through assembly 600, into a receptacle 610 (e.g., such as a cup, mug, and/or carafe).

Figure 8:
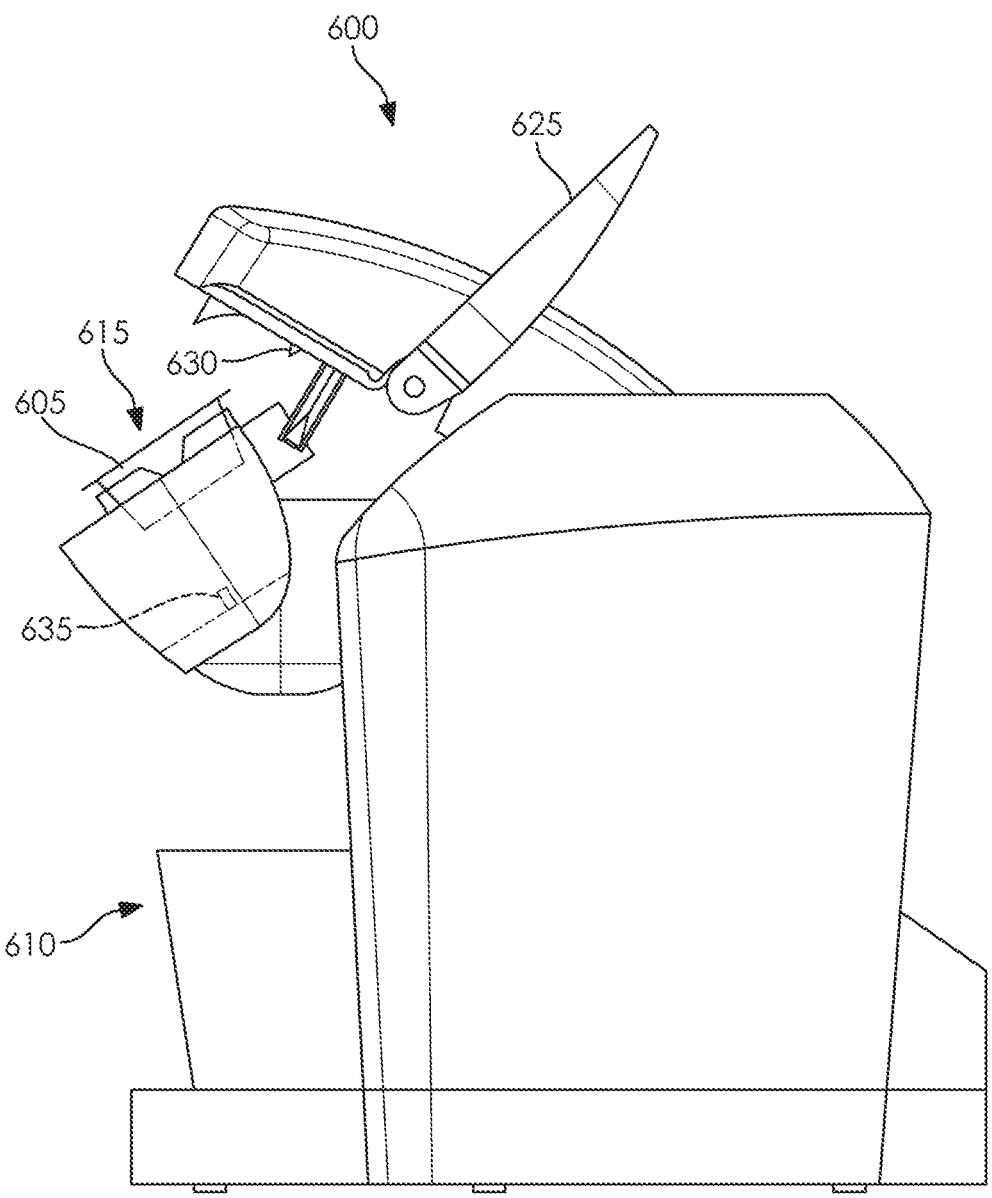
FIG. 8 is a side view of an exemplary system for using the present invention.

For example as illustrated in FIGS. 7 and 8, machine 600 may include a portion 615 configured to receive assembly 605. Assembly 605 may be placed in a cavity 620 configured to receive assembly 605. Portion 615 may be closed (e.g., by a user using a handle 625) to enclose assembly 605 in order to inject a fluid such as water into assembly 605. Machine 600 may also include a passage 630 that may penetrate a portion of assembly 605 when portion 615 has been closed about assembly 605. For example, passage 630 may be a passage such as a needle (e.g., liquid delivery needle) that may inject liquid into assembly 605. For example, when assembly 605 is an assembly such as assembly 100, passage 630 may penetrate (e.g., pierce or puncture) a portion of cover member 115 so that passage 630 extends into cavity 200 as disclosed for example below. Machine 600 may then inject a fluid into assembly 605 (e.g., cavity 200 of assembly 100) to prepare (e.g., brew) a beverage as disclosed below. Machine 600 may then dispense a beverage into receptacle 610 following brewing.

Machine 600 may also include a passage 635. Passage 635 may be for example a lower extraction needle configured to penetrate a lower portion of a conventional single serve pod that may have a significantly greater depth than assembly 605 (e.g., than assembly 100, assembly 300, assembly 400, and/or assembly 500). For example, passage 635 may penetrate a lower portion of a conventional single serve pod. For example, based on a reduced-depth of assembly 605 (e.g., assembly 100, assembly 300, assembly 400, and/or assembly 500), passage 635 may not penetrate a lower portion of assembly 605 because assembly 605 may not extend low enough in cavity 620 for passage 635 to reach assembly 605. Accordingly for example, machine 600 may dispense a beverage from assembly 605 (e.g., assembly 100, assembly 300, assembly 400, and/or assembly 500) based on passage 630 penetrating an upper portion of assembly 605 and an operation of assembly 605 (e.g., assembly 100, assembly 300, assembly 400, and/or assembly 500) as disclosed below. Accordingly for example, a beverage may be dispensed from assembly 605 (e.g., assembly 100, assembly 300, assembly 400, and/or assembly 500) without passage 635 (e.g., or another similar part of machine 600) penetrating a lower portion of assembly 605 (e.g., assembly 100, assembly 300, assembly 400, and/or assembly 500).

The exemplary disclosed apparatus and method may be used in any suitable application for preparing a beverage. For example, the exemplary disclosed apparatus and method may be used in any suitable technique for preparing a beverage using liquid concentrate such as, for example, use of a single serve pod brewing machine and/or manually preparing a beverage from liquid concentrate. For example, the exemplary disclosed apparatus and method may be used to make any suitable type of beverage from liquid concentrate such as, for example, coffee, tea, juices (e.g., orange juice, apple juice, and/or any other type of juice), energy and/or nutritional drinks, milk, shake and/or other dessert beverages, baby formula, medicine (e.g., medicine to be mixed with a liquid), and/or any other suitable type of substance formed by mixing liquid concentrate with one or more liquids. For example, the exemplary disclosed apparatus and method may be used with or without a single serve pod brewing machine to make any suitable beverage by mixing a liquid concentrate with any suitable liquid such as, e.g., water and/or any other suitable material.

Figure 9:
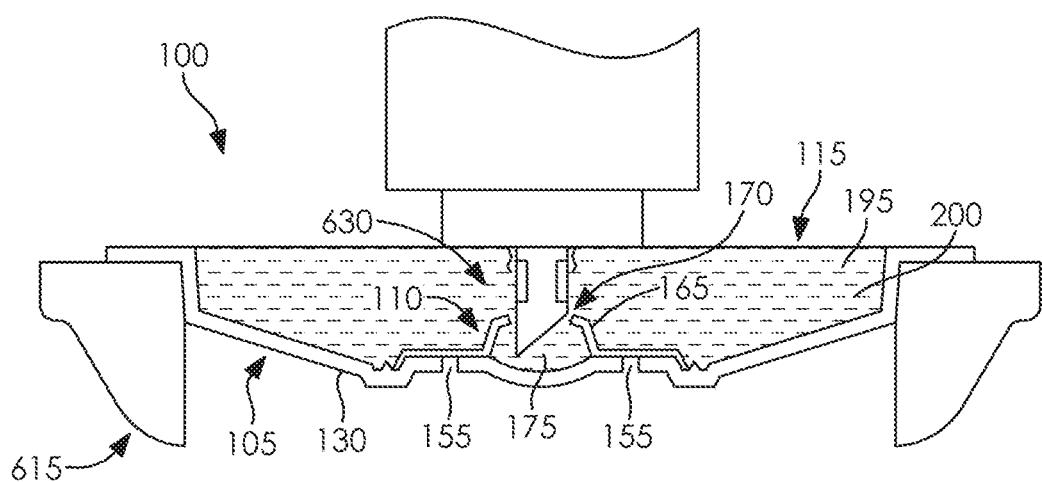
FIG. 9 is a schematic view of an exemplary system for using the present invention.
Figure 10:
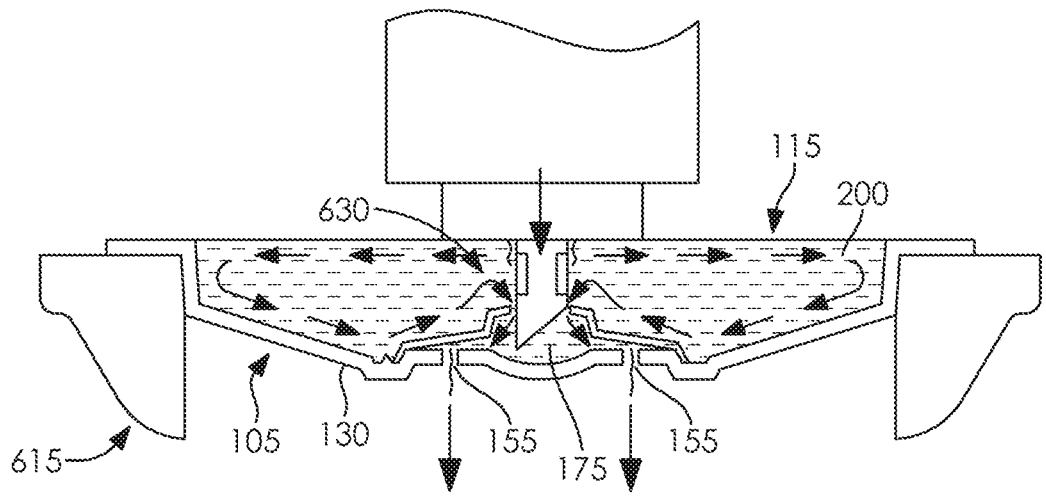
FIG. 10 is a schematic view of an exemplary system for using the present invention.

An exemplary operation of the exemplary disclosed apparatus and method will now be described. For example as illustrated in FIGS. 9 and 10, passage 630 may penetrate through cover member 115 of assembly 100. Passage 630 may also penetrate scored portion 170 disposed at the center of portion 165. For example, after cover member 115 and portion 170 are punctured prior to a start of a brew cycle, material 195 flows into cavity 175 via gravity. For example, material 195 disposed in cavity 200 moves into cavity 175. Also for example if material 198 is disposed in cavity 175, material 195 mixes with material 198. Also for example, a seal (e.g., a compression seal and/or a pressure seal) between intermediate member 110 and aperture 155 may block material 195 from flowing through aperture 155. Machine 600 may begin a brewing cycle by directing a flow of a liquid (e.g., such as water or other suitable liquid disclosed above) into cavities 175 and 200 via passage 630. For example, liquid such as water may flow from passage 630 into cavities 175 and 200 as shown by the exemplary flows (e.g., denoted by arrows) illustrated in FIG. 10. During the ensuing brew process, pressure increases within cavities 175 and 200 based on passage 630 injecting (e.g., continuously injecting) liquid into assembly 100. The liquid injected into assembly 100 mixes with material 195 and/or material 198 within cavities 175 and 200. As pressure increases, intermediate member 110 separates from body member 105 (e.g., a seal between intermediate member 110 and body member 105 is broken) and apertures 155 become unsealed (e.g., exposed). Brewed liquid mixed with material 195 and/or 198 escapes from assembly 100 as illustrated in FIG. 10 and may be dispensed into receptacle 610 disposed below portion 615 of machine 600. Brewed liquid mixed with material 195 and/or 198 flows by gravity and/or flows under pressure down sloped portion 130 toward apertures 155. Also for example, exterior surfaces (e.g., bottom surfaces) of portion 135 and/or portions 130 and 140 (e.g., disposed near portion 135) may provide one or more protrusions that may serve to direct brewed liquid mixed with material 195 and/or 198 down toward receptacle 610.

Figure 11:
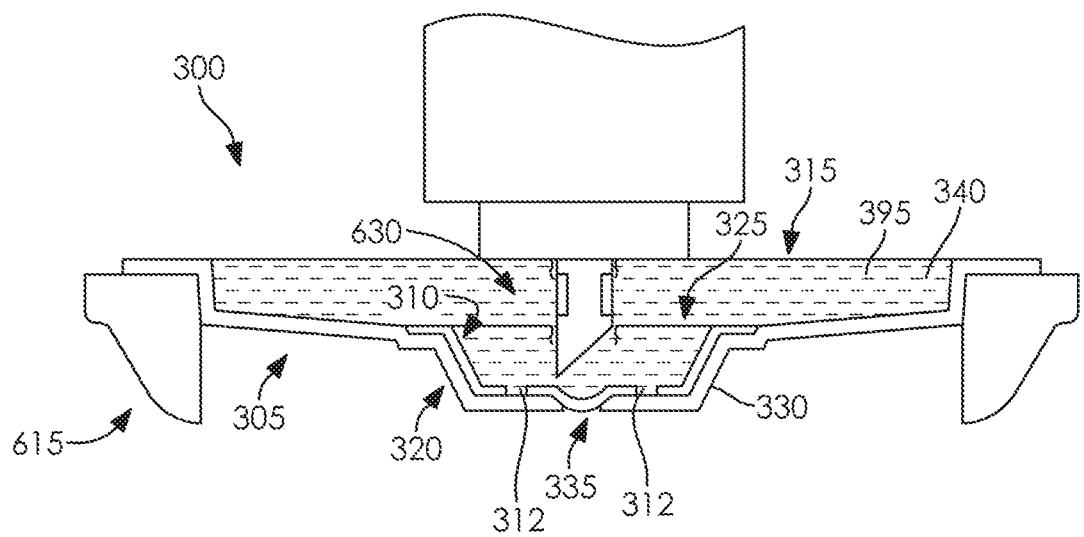
FIG. 11 is a schematic view of an exemplary system for using the present invention.
Figure 12:
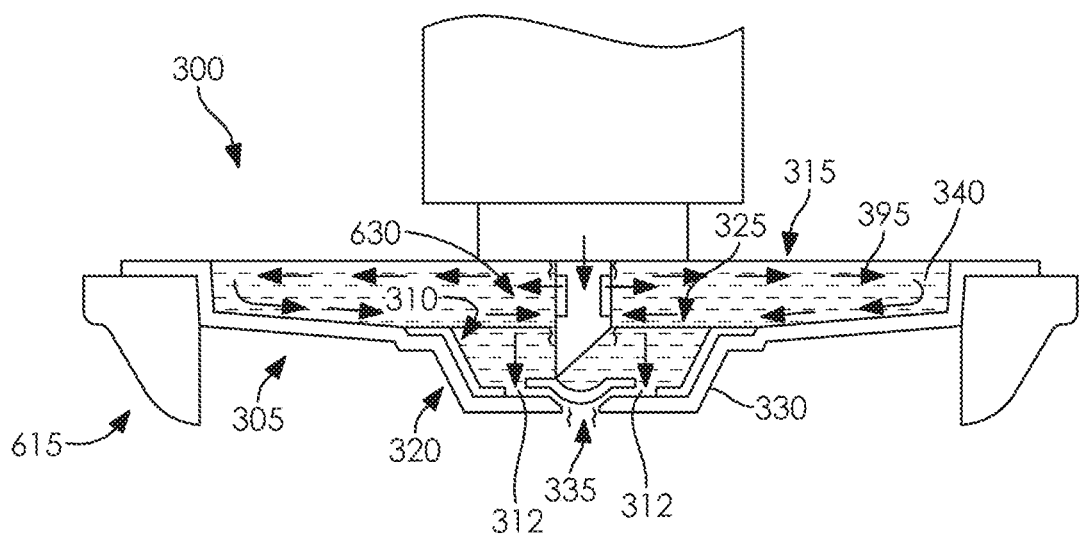
FIG. 12 is a schematic view of an exemplary system for using the present invention.

FIGS. 11 and 12 illustrate another exemplary operation of the exemplary disclosed apparatus and method. For example, passage 630 may penetrate through cover member 315 of assembly 300. Passage 630 may also penetrate lower cover member 325. For example, after cover member 315 and lower cover member 325 are punctured prior to a start of a brew cycle, material 395 flows into cavity 345. For example, material 395 disposed in cavity 340 may move into cavity 345. Also for example if material 398 is disposed in cavity 345, material 395 may mix with material 398. Also for example, apertures 312 and 335 may be closed to each other via a compression fit between intermediate member 310 and body member 305 that may block material 395 from flowing through aperture 335. Machine 600 may begin a brewing cycle by directing a flow of a liquid (e.g., such as water or other suitable liquid disclosed above) into cavities 340 and 345 via passage 630. For example, liquid such as water may flow from passage 630 into cavities 340 and 345 as shown by the exemplary flows (e.g., denoted by arrows) illustrated in FIG. 12. During the ensuing brew process, pressure increases within cavities 340 and 345 based on passage 630 injecting (e.g., continuously injecting) liquid into assembly 300. The liquid injected into assembly 300 mixes with material 395 and/or material 398 within cavities 340 and 345. As pressure increases, intermediate member 310 separates from body member 305 (e.g., a seal between intermediate member 310 and body member 305 is broken) and one or more apertures 335 become unsealed (e.g., exposed). Also for example, as intermediate member 310 separates from body member 305, brewed liquid mixed with material 395 and/or 398 may pass through both apertures 312 and 335. Brewed liquid mixed with material 395 and/or 398 escapes from assembly 300 as illustrated in FIG. 12 and may be dispensed into receptacle 610 disposed below portion 615 of machine 600. Brewed liquid mixed with material 395 and/or 398 flows by gravity and/or flows under pressure down sloped portion 330 (e.g., and/or a sloped floor portion of body member 305) toward one or more apertures 335.

Figure 13:
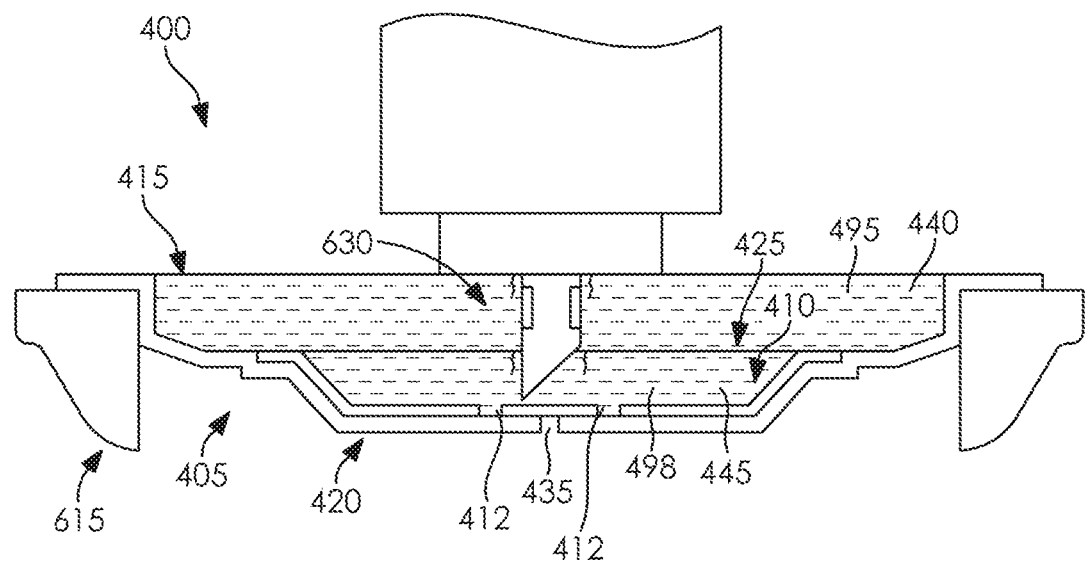
FIG. 13 is a schematic view of an exemplary system for using the present invention.
Figure 14:
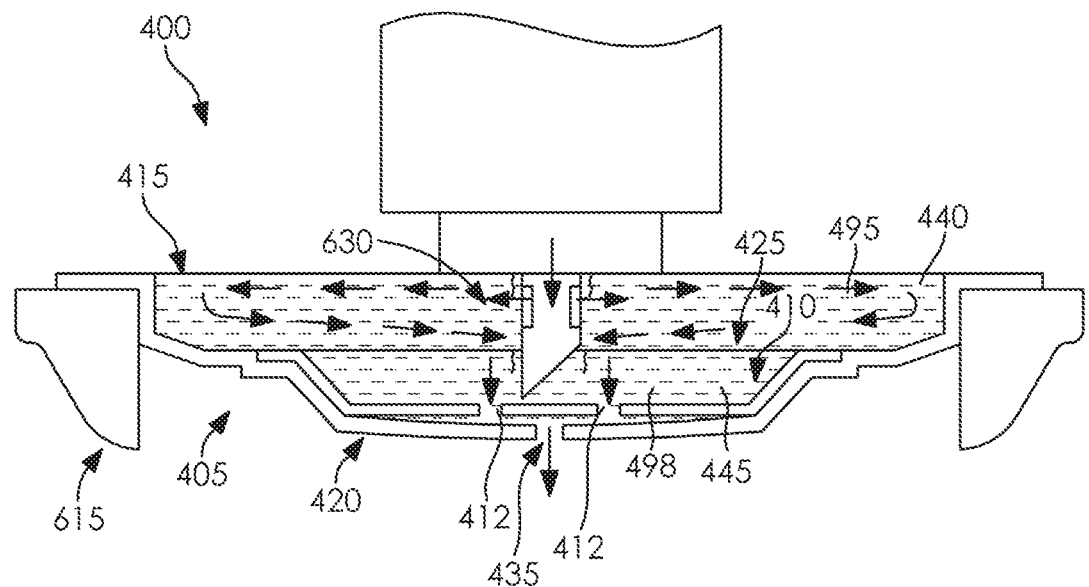
FIG. 14 is a schematic view of an exemplary system for using the present invention.

FIGS. 13 and 14 illustrate another exemplary operation of the exemplary disclosed apparatus and method. For example, passage 630 may penetrate through cover member 415 of assembly 400. Passage 630 may also penetrate lower cover member 425. For example, after cover member 415 and lower cover member 425 are punctured prior to a start of a brew cycle, material 495 flows into cavity 445. For example, material 495 disposed in cavity 440 may move into cavity 445. Also for example if material 498 is disposed in cavity 445, material 495 may mix with material 498. Also for example, apertures 412 and 435 may be closed to each other via a compression fit between intermediate member 410 and body member 405 that may block material 495 from flowing through aperture 435. Machine 600 may begin a brewing cycle by directing a flow of a liquid (e.g., such as water or other suitable liquid disclosed above) into cavities 440 and 445 via passage 630. For example, liquid such as water may flow from passage 630 into cavities 440 and 445 as shown by the exemplary flows (e.g., denoted by arrows) illustrated in FIG. 14. During the ensuing brew process, pressure increases within cavities 440 and 445 based on passage 630 injecting (e.g., continuously injecting) liquid into assembly 400. The liquid injected into assembly 400 mixes with material 495 and/or material 498 within cavities 440 and 445. As pressure increases, intermediate member 410 separates from body member 405 (e.g., a seal between intermediate member 410 and body member 405 is broken) and one or more apertures 435 become unsealed (e.g., exposed). Also for example, as intermediate member 410 separates from body member 405, brewed liquid mixed with material 495 and/or 498 may pass through both apertures 412 and 435. Brewed liquid mixed with material 495 and/or 498 escapes from assembly 400 as illustrated in FIG. 14 and may be dispensed into receptacle 610 disposed below portion 615 of machine 600. Brewed liquid mixed with material 495 and/or 498 flows by gravity and/or flows under pressure down sloped floor portions of body member 405 and/or lower body member 420.

Figure 15:
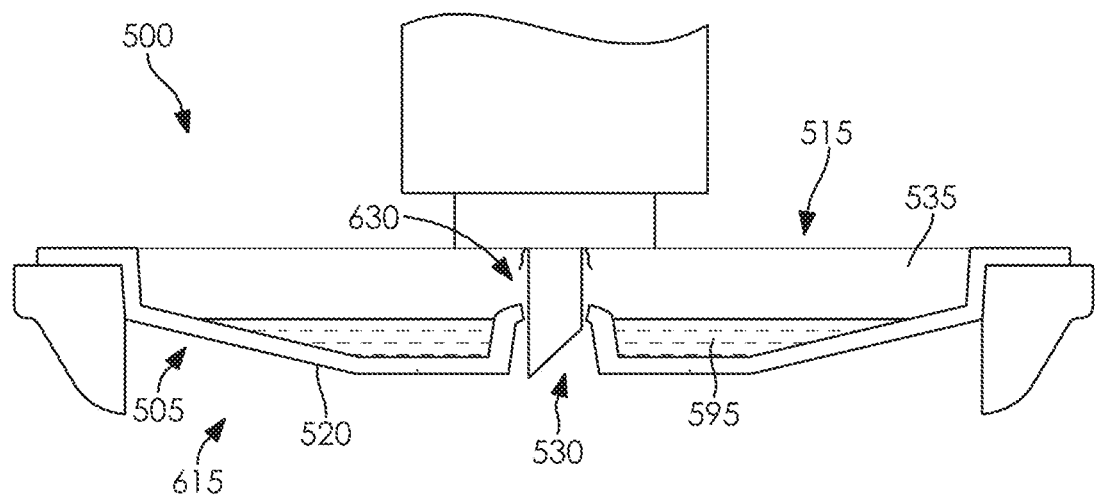
FIG. 15 is a schematic view of an exemplary system for using the present invention.
Figure 16:
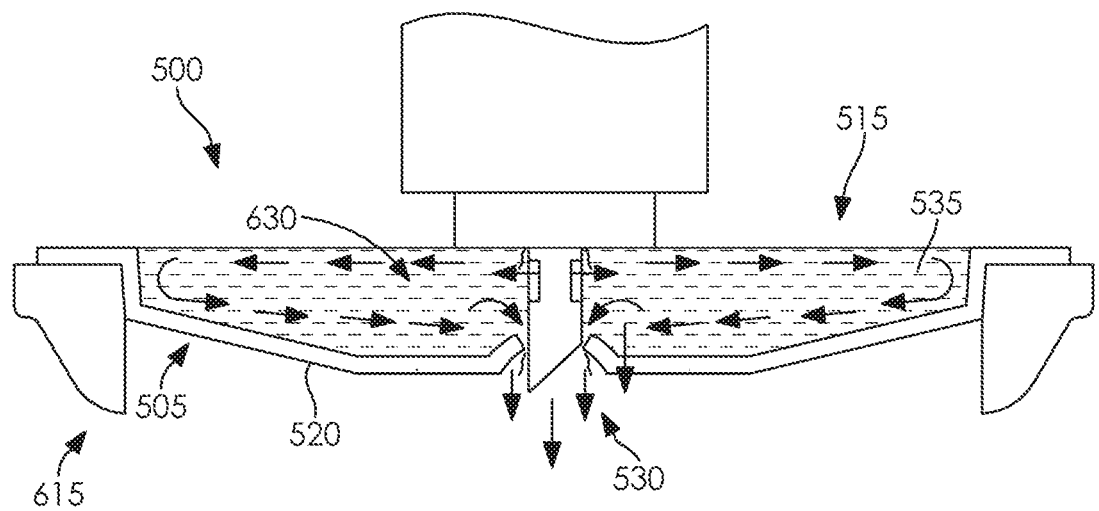
FIG. 16 is a schematic view of an exemplary system for using the present invention.

FIGS. 15 and 16 illustrate another exemplary operation of the exemplary disclosed apparatus and method. For example, passage 630 may penetrate through cover member 515 of assembly 500. Passage 630 may also penetrate portion 530. Prior to a brewing process, material 595 may be retained within cavity 535 by portion 530 as illustrated for example in FIG. 15. Machine 600 may begin a brewing cycle by directing a flow of a liquid (e.g., such as water or other suitable liquid disclosed above) into cavity 535 via passage 630. For example, liquid such as water may flow from passage 630 into cavity 535 as shown by the exemplary flows (e.g., denoted by arrows) illustrated in FIG. 16. During the ensuing brew process, pressure increases within cavity 535 based on passage 630 injecting (e.g., continuously injecting) liquid into assembly 500. The liquid injected into assembly 500 mixes with material 595 within cavity 535. As pressure increases, portion 530 may displace (e.g., deflect and/or collapse under pressure) from the exemplary configuration illustrated in FIG. 15 to the exemplary configuration illustrated in FIG. 16. Brewed liquid mixed with material 595 flows by gravity down sloped portion 520 of body member 505. Because portion 530 may be collapsed (e.g., collapsed under pressure during the brewing cycle as illustrated in FIG. 16), portion 530 may no longer serve as a barrier impeding a flow of brewed liquid, and brewed liquid mixed with material 595 may flow toward an aperture at a bottom of body member 505 created by a penetration of passage 630 (e.g., at portion 530). Brewed liquid mixed with material 595 escapes from a lower portion of assembly 500 (e.g., at collapsed portion 530) as illustrated in FIG. 16 and may be dispensed into receptacle 610 disposed below portion 615 of machine 600.

Figure 17:
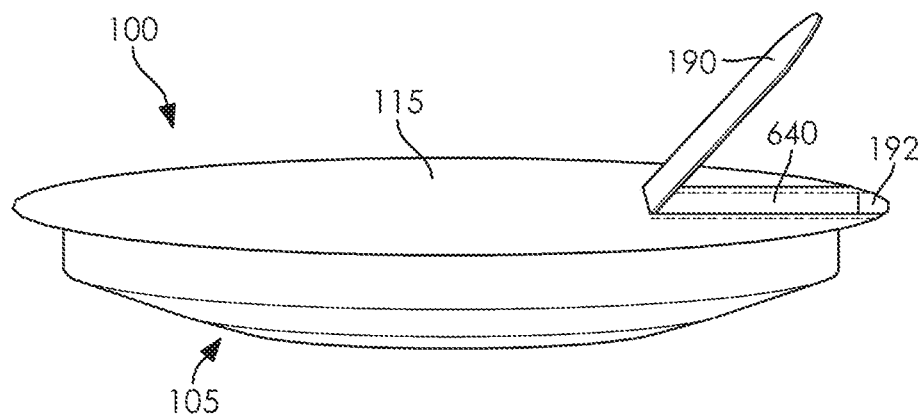
FIG. 17 is a schematic view of an exemplary system for using the present invention.

FIG. 17 illustrates another exemplary operation of the exemplary disclosed apparatus and method. For example, a user may choose to utilize any of the above exemplary assemblies (e.g., assembly 100, assembly 300, assembly 400, assembly 500, and/or any suitable exemplary disclosed assembly) without a beverage-preparation machine such as machine 600. For example, a user may pull portion 190 (e.g., pull back portion 190 that may be a pull tab) to create an aperture 640 in cover member 115. Material 195 (e.g., and/or material 198) may then be manually poured by a user out of cavity 200 (e.g., unsealed cavity 200). Exposed portion 192 that may be a spout portion may facilitate pouring of material 195 from cavity 200. A user may then manually dispense material 195 (e.g., a liquid concentrate) into a receptacle (e.g., cup or mug) containing hot or cold liquid in any ration dsired by the user without use of a specialized beverage-preparation machine.

Figure 18:
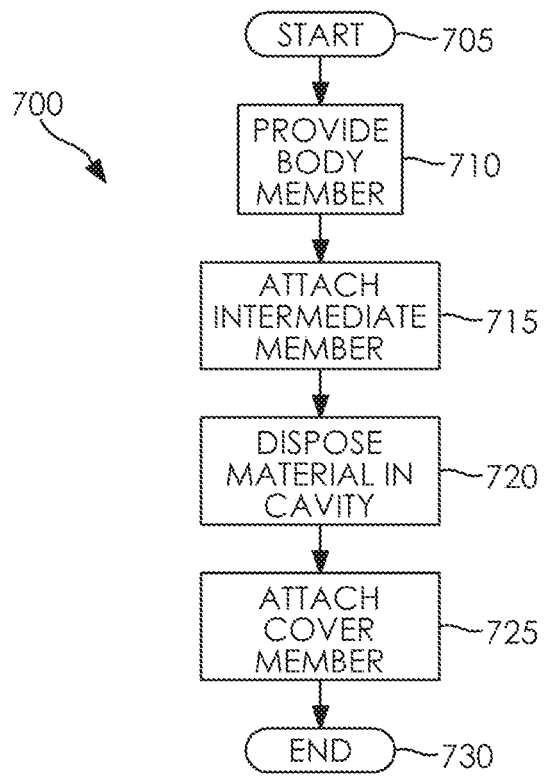
FIG. 18 illustrates an exemplary process for manufacturing the exemplary apparatus.

FIG. 18 illustrates an exemplary process 700 for manufacturing the exemplary apparatus (e.g., assembly 100, assembly 300, assembly 400, assembly 500, and/or any suitable exemplary disclosed assembly). Process 700 starts at step 705 (exemplary assembly 100 will be used to describe the below exemplary process). At step 710, body member 105 may be provided. At step 715, intermediate member 110 may be attached to body member 105 to form sealed cavity 175 (e.g., material 198 may be placed in cavity 175 prior to sealing). At step 720, material 195 may be disposed in cavity 200. At step 725, cover member 115 may then be attached to body member 105 to form sealed cavity 200. UV light may be used for sterilization of the exemplary assembly during the manufacturing process. Also for example, inert gas may be purged from the exemplary assembly (e.g., from cavity 175 and/or cavity 200) to maintain freshness of the exemplary added material using any suitable technique.

The exemplary disclosed apparatus and method may provide a shelf-stable liquid concentrate beverage pod that may be reduced in size and compatible with at least some or substantially all single-serve brewing machines and/or other suitable beverage-preparation machines. For example, the disclosed apparatus and method may provide a single serve pod that may be reduced in size, thereby simplifying and reducing packaging size. For example, the exemplary disclosed apparatus and method may provide a single serve pod of reduced size that provides a beverage flavor of high quality at reduced cost (e.g., based on reduced shipping, packaging, and storage costs). Also for example, the exemplary disclosed apparatus and method may provide a single serve pod that may be used with most or substantially all brewing machines configured to receive single serve pods and/or any other suitable beverage-preparation machines without adaptation or reconfiguration of the brewing machine. Further for example, the exemplary disclosed apparatus and method may utilize shelf-stable liquid concentrates to significantly reduce a size of a single serve pod while still providing a single serve pod sized and configured to be used without alteration with most or substantially all brewing machines using single serve pods and/or any other suitable beverage-preparation machines. The exemplary disclosed apparatus and method may also provide a single serve pod that can be used without a brewing machine (e.g., and/or without any other suitable beverage-preparation machine) to make a beverage.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed apparatus and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. An assembly, comprising:
   a body member;
   an intermediate member attached to the body member;
   a first sealed cavity formed by the body member and the intermediate member;
   a cover member attached to the body member;
   a second sealed cavity formed by the cover member, the body member, and the intermediate member; and
   a beverage-preparation liquid concentrate disposed in the second sealed cavity.

2. The assembly of claim 1, wherein the body member includes at least one aperture.

3. The assembly of claim 2, wherein the intermediate member attached to the body member covers the at least one aperture.

4. The assembly of claim 1, wherein a total depth of the assembly is between about one-fourth and about one-fifth of a total width of the assembly.

5. The assembly of claim 1, further comprising a beverage additive disposed within the first sealed cavity.

6. The assembly of claim 1, wherein the body member, the intermediate member, and the cover member are formed from compostable or recyclable material.

7. The assembly of claim 1, wherein the body member and the cover member are formed from opaque material.

8. The assembly of claim 1, wherein the cover member includes a pull tab configured to unseal the second sealed cavity, and the body member includes a spout aligned with the pull tab.

9. An assembly, comprising:
   a body member;
   an intermediate member attached to the body member;
   a first cover member attached to the body member;
   a first sealed cavity formed by the first cover member and the intermediate member;
   a second cover member attached to the body member;
   a second sealed cavity formed by the second cover member, the body member, and the first cover member; and
   a beverage-preparation liquid concentrate disposed in the second sealed cavity.

10. The assembly of claim 9, wherein the body member includes at least one aperture.

11. The assembly of claim 10, wherein the intermediate member attached to the body member covers the at least one aperture, and the intermediate member includes an intermediate member aperture that is misaligned with the at least one aperture.

12. The assembly of claim 9, wherein a total depth of the assembly is less than or equal to about one-fifth of a total width of the assembly.

13. The assembly of claim 9, wherein the first sealed cavity and the second sealed cavity are cavities selected from the group consisting of heat-sealed cavities, heat-welded cavities, thermo-sealed cavities, and ultrasonic-welded cavities.

14. The assembly of claim 9, further comprising a beverage additive disposed within the first sealed cavity.

15. The assembly of claim 9, wherein the body member, the intermediate member, and the cover member are formed from compostable or recyclable material.

16. A single serve pod for preparing a beverage, comprising:
- a single serve pod body member;
- a single serve pod cover member attached to the single serve pod body member;
- a sealed cavity formed by the single serve pod body member and the single serve pod cover member; and
- a beverage-preparation liquid concentrate disposed in the sealed cavity;
- wherein the single serve pod body member includes a protruding portion that extends into the sealed cavity.

17. The single serve pod of claim 16, wherein the protruding portion has a wall thickness that is less than a wall thickness of a remaining portion of the single serve pod body member.

18. The single serve pod of claim 16, wherein the single serve pod body member and the single serve pod cover member are formed from compostable or recyclable material.

19. The single serve pod of claim 16, wherein a total depth of the single serve pod is less than or equal to about one-fourth of a total width of the single serve pod.

20. The single serve pod of claim 16, wherein the beverage-preparation liquid concentrate is a coffee liquid concentrate or a tea liquid concentrate.

\* \* \* \* \*